| (12) | United States Patent | (10) Patent No.: | US 8,218,882 B2 |
|---|---|---|---|
| | Sato | (45) Date of Patent: | Jul. 10, 2012 |

(54) IMAGE CODING METHOD, IMAGE CODING APPARATUS, IMAGE CODING CIRCUIT, INFORMATION RECORDING MEDIUM, AND COMPUTER PROGRAM

(75) Inventor: Yutaka Sato, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 1154 days.

(21) Appl. No.: 12/047,891

(22) Filed: Mar. 13, 2008

(65) Prior Publication Data

US 2008/0226187 A1 Sep. 18, 2008

(30) Foreign Application Priority Data

Mar. 15, 2007 (JP) ................................. 2007-067254

(51) Int. Cl.
*G06K 9/36* (2006.01)
*G06K 9/46* (2006.01)

(52) U.S. Cl. ......... 382/232; 382/240; 382/246; 382/248

(58) Field of Classification Search .................. 382/232, 382/233, 234, 239, 240, 246, 247, 248
See application file for complete search history.

(56) References Cited

U.S. PATENT DOCUMENTS

| 5,016,207 A | 5/1991 | Fuji et al. |
| 5,119,045 A | 6/1992 | Sato |
| 5,337,168 A | 8/1994 | Fuji et al. |
| 5,349,610 A | 9/1994 | Sakamoto et al. |
| 5,673,043 A | 9/1997 | Hayashi et al. |
| 6,895,120 B2 | 5/2005 | Satoh et al. |
| 6,950,558 B2 | 9/2005 | Schwartz et al. |
| 6,961,475 B2 | 11/2005 | Schwartz et al. |
| 6,975,772 B2 | 12/2005 | Sato |
| 7,006,697 B1 | 2/2006 | Gormish et al. |
| 7,599,840 B2 * | 10/2009 | Mehrotra et al. ............. 704/501 |
| 7,693,709 B2 * | 4/2010 | Thumpudi et al. ............ 704/205 |
| 2003/0081847 A1 | 5/2003 | Sato |
| 2003/0152280 A1 | 8/2003 | Kadowaki et al. |
| 2004/0247185 A1 | 12/2004 | Sato et al. |
| 2004/0264783 A1 | 12/2004 | Sato et al. |
| 2005/0063599 A1 | 3/2005 | Sato |
| 2005/0117808 A1 | 6/2005 | Sato |
| 2005/0238242 A1 | 10/2005 | Schwartz et al. |
| 2006/0071825 A1 * | 4/2006 | Demos ........................... 341/50 |
| 2006/0159355 A1 * | 7/2006 | Mizuno ......................... 382/239 |
| 2006/0228034 A1 | 10/2006 | Mizuno et al. |

FOREIGN PATENT DOCUMENTS

| JP | 2004-350162 | 9/2004 |
| JP | 2004-350162 | 12/2004 |
| JP | 2005-039793 | 2/2005 |
| JP | 2006-033868 | 2/2006 |
| JP | 2006-295299 | 10/2006 |
| JP | 2006-295561 | 10/2006 |

* cited by examiner

*Primary Examiner* — Phuoc Tran
(74) *Attorney, Agent, or Firm* — Dickstein Shapiro LLP

(57) ABSTRACT

An image coding method is disclosed by which plural code data sets each having a different code amount are generated from one image data set that includes a target code amount setting step for setting a different target code amount for each of the code data sets; an entropy code generation step for applying entropy coding processing to the image data set or data obtained by applying predetermined processing to the image data set so as to generate plural entropy codes; a code amount control step for specifying one of the entropy codes to be truncated so as to control a code amount for each different target code amount; and a code data generation step for truncating the one of the entropy codes specified in the code amount control step and generating the corresponding code data set.

13 Claims, 15 Drawing Sheets

|  |  | 3LL | 3HL | 3LH | 3HH | 2HL | 2LH | 2HH | 1HL | 1LH | 1HH |
|---|---|---|---|---|---|---|---|---|---|---|---|
| INDEX0 | Y | 0 | 0 | 0 | 0 | 0 | 0 | 0 | 0 | 0 | 0 |
| | Cb | 0 | 0 | 0 | 0 | 0 | 0 | 0 | 0 | 0 | 0 |
| | Cr | 0 | 0 | 0 | 0 | 0 | 0 | 0 | 0 | 0 | 0 |
| INDEX1 | Y | 0 | 0 | 0 | 0 | 0 | 0 | 0 | 0 | 0 | 0 |
| | Cb | 0 | 0 | 0 | 0 | 0 | 0 | 0 | 0 | 0 | 1 |
| | Cr | 0 | 0 | 0 | 0 | 0 | 0 | 0 | 0 | 0 | 0 |
| INDEX2 | Y | 0 | 0 | 0 | 0 | 0 | 0 | 0 | 0 | 0 | 0 |
| | Cb | 0 | 0 | 0 | 0 | 0 | 0 | 0 | 0 | 0 | 1 |
| | Cr | 0 | 0 | 0 | 0 | 0 | 0 | 0 | 0 | 0 | 1 |
| INDEX3 | Y | 0 | 0 | 0 | 0 | 0 | 0 | 0 | 0 | 0 | 0 |
| | Cb | 0 | 0 | 0 | 0 | 0 | 0 | 0 | 0 | 0 | 2 |
| | Cr | 0 | 0 | 0 | 0 | 0 | 0 | 0 | 0 | 0 | 1 |
| INDEX4 | Y | 0 | 0 | 0 | 0 | 0 | 0 | 0 | 0 | 0 | 0 |
| | Cb | 0 | 0 | 0 | 0 | 0 | 0 | 0 | 0 | 0 | 2 |
| | Cr | 0 | 0 | 0 | 0 | 0 | 0 | 0 | 0 | 0 | 2 |
| INDEX5 | Y | 0 | 0 | 0 | 0 | 0 | 0 | 0 | 0 | 0 | 0 |
| | Cb | 0 | 0 | 0 | 0 | 0 | 0 | 0 | 0 | 1 | 2 |
| | Cr | 0 | 0 | 0 | 0 | 0 | 0 | 0 | 0 | 0 | 2 |
| INDEX6 | Y | 0 | 0 | 0 | 0 | 0 | 0 | 0 | 0 | 0 | 0 |
| | Cb | 0 | 0 | 0 | 0 | 0 | 0 | 0 | 0 | 1 | 2 |
| | Cr | 0 | 0 | 0 | 0 | 0 | 0 | 0 | 0 | 1 | 2 |

IMAGE CODING METHOD, IMAGE CODING APPARATUS, IMAGE CODING CIRCUIT, INFORMATION RECORDING MEDIUM, AND COMPUTER PROGRAM

BACKGROUND OF THE INVENTION

1. Field of the Invention

The present invention relates to an image coding method, an image coding apparatus, an image coding circuit, an information recording medium, and a computer program.

2. Description of the Related Art

Up until now, techniques of controlling the code amount of code data to be generated have been known in image coding methods in which image data are compressed to generate the code data.

For example, JP-A-2006-33868 (Patent Document 1) discloses the invention of an image processing apparatus that controls the code amount by converting image data into frequency components and eliminating entropy-coded data corresponding to the frequency components in a predetermined range from the entropy-coded image code data. Moreover, Patent Document 1 discloses an image processing method in which the range of the frequency components to be eliminated is changed to output code data having a different code amount.

Furthermore, for example, JP-A-2004-350162 (Patent Document 2) discloses the invention of an image coding apparatus that includes plural sets of quantization units and subsequent units that control the code amount to output plural coded data sets each having a different code amount from one image.

Note that the "coded data" in Patent Documents 1 and 2 correspond to the "code data" of the embodiments of the present invention.

Patent Document 1: JP-A-2006-33868
Patent Document 2: JP-A-2004-350162

SUMMARY OF THE INVENTION

However, in order to generate the plural coded data sets each having a different code amount, the inventions disclosed in Patent Documents 1 and 2 are configured to have plural units that perform at least entropy coding processing in accordance with the number of coded data sets to be generated.

For example, if the entropy coding processing is based on Huffman coding with a relatively small number of codes, it is possible to prevent the apparatus from being excessively increased in size even where the configurations of Patent Documents 1 and 2 are adopted. However, if an extremely large number of codes are used, or if the entropy coding processing is based on arithmetic coding, the size of the units and the number of steps required for performing such processing become enormous. In this case, the whole size of the apparatus becomes large if the units that perform the entropy coding processing are provided to correspond to plural code data sets each having a different code amount. Nevertheless, Patent Document 1 and 2 do not take such a problem into consideration.

The present invention has been made to solve such a problem in view of the above circumstances and may provide an image coding method, an image coding apparatus, an image coding circuit, a computer program, and an information recording medium for generating plural code data sets each having a different code amount with a simple configuration.

In order to attain the above object, the image coding method according to the embodiments of the present invention adopts the following configurations.

According to one aspect of the present invention, there is provided an image coding method by which plural code data sets each having a different code amount are generated from one image data set. The method comprises a target code amount setting step for setting a different target code amount for each of the code data sets; an entropy code generation step for applying entropy coding processing to the image data set or data obtained by applying predetermined processing to the image data set so as to generate plural entropy codes; a code amount control step for specifying one of the entropy codes to be truncated so as to control a code amount for each different target code amount; and a code data generation step for truncating the one of the entropy codes specified in the code amount control step and generating the corresponding code data set.

Accordingly, it is possible to provide the image coding method by which plural code data sets each having a different code amount are generated with a simple configuration.

Furthermore, in order to attain the above object, the code amount control step includes a candidate specification step for specifying a candidate for the entropy code to be truncated; a calculation step for calculating a code amount of other codes excluding the entropy code specified in the candidate specification step; a determination step for determining whether the code amount calculated in the calculation step and the target code amount satisfy a predetermined relationship; and a specification step for specifying the candidate for the entropy code to be truncated as an entropy code to be truncated if the code amount and the target code amount satisfy the predetermined relationship. In the candidate specification step, if the code amount and the target code amount do not satisfy the predetermined relationship, another candidate for the entropy code to be truncated is added in the order of making a lesser contribution to quality of a decoded image corresponding to the code data set so as to specify the candidate for the entropy code to be truncated, or an entropy code not to be truncated is added in the order of making a greater contribution to the decoded image corresponding to the code data set so as to correct the candidate for the entropy code to be truncated.

Accordingly, it is possible to select the entropy code to be truncated in the order of making a lesser contribution to the quality of a decoded image corresponding to the code data set so as to generate the code data set having a code amount closer to a target code amount.

Furthermore, in order to attain the above object, in the candidate specification step, the candidate for the entropy code to be truncated is specified based on a table in which information related to the contribution to the quality of the decoded image corresponding to the code data set is made to correspond to a cluster having the different entropy code.

Accordingly, it is possible to accelerate and simplify the processing since the table related to the order of truncating an entropy code is provided in advance. In addition, it is possible to prevent degradation of the quality of a decoded image since the table has information related to a contribution to the quality of the decoded image corresponding to code data.

Furthermore, in order to attain the above object, where the entropy coding processing is applied to a bit plane constituting data input in the entropy code generation step, the candidate for the entropy code to be truncated is specified by specifying the bit plane in the candidate specification step.

Accordingly, it is possible to make a unit for performing the entropy coding processing be identical to a unit for the entropy code to be truncated, thereby completing the entropy codes in the code data set.

Furthermore, in order to attain the above object, the predetermined processing includes frequency decomposition.

Accordingly, it is possible to divide or delete data in accordance with a contribution to the quality of a decoded image using the frequency decomposition.

Furthermore, in order to attain the above object, where the frequency decomposition comprises wavelet transformation in which sub-band transformation is repeatedly performed, the entropy code to be truncated is specified according to the level of a sub-band in the code amount control step.

Accordingly, it is possible to generate plural code data sets each having a different resolution in accordance with a target code amount.

Furthermore, in order to attain the above object, where the JPEG-2000 standard is used, the entropy code to be truncated is specified based on a table in which the number of passes of the entropy code to be truncated is specified for a different component and/or a different sub-band.

Accordingly, where the image coding method is based on the JPEG-2000 standard, it is possible to make a unit for the coding processing be identical to a unit for truncating the entropy code to be truncated. In addition, it is possible to accelerate and simplify the processing since the number of passes of the entropy code to be truncated is specified in the table in advance.

In order to solve the above problem, the present invention may further provide an image coding apparatus having units that perform the respective steps of the image coding method, an image coding circuit having circuits that perform the respective steps of the image coding method, a computer program that causes a computer to perform the image coding method, or an information recording medium having recorded therein the computer program.

Moreover, the present invention may further provide a recording medium having recorded therein information related to the entropy code to be truncated in the order of making a lesser contribution to quality of a decoded image corresponding to the code data set.

According to the embodiments of the present invention, it is possible to provide an image coding method, an image coding apparatus, an image coding circuit, a computer program, and an information recording medium for generating plural code data sets each having a different code amount with a simple configuration.

Other objects, features and advantages of the present invention will become more apparent from the following detailed description when read in conjunction with the accompanying drawings.

BRIEF DESCRIPTION OF THE DRAWINGS

FIG. 8 is a diagram for illustrating components, sub-bands, and levels;

FIG. 10 is an example of an information table related to a contribution to the quality of a decoded image corresponding to code data;

DETAILED DESCRIPTION OF THE PREFERRED EMBODIMENTS

Prior to describing an image coding method according to an embodiment of the present invention, a description is first made of a conventional image coding apparatus that generates plural code data sets each having a different code amount so as to facilitate the understanding of the image coding method according to the present invention.

(Configuration Example of Image Coding Apparatus that Generates One Code Data Set)

Figure 1:
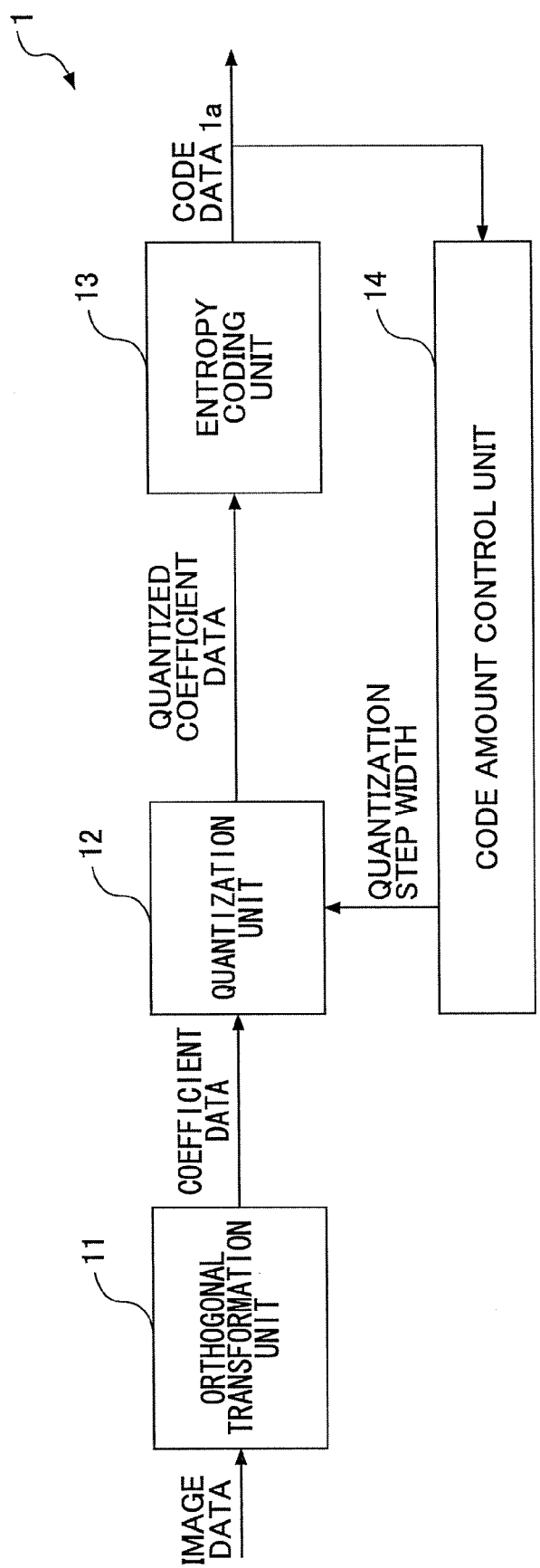
FIG. 1 is a configuration example of an image coding apparatus that generates one code data set.

FIG. 1 is a configuration example of an image coding apparatus that generates one code data set. The image coding apparatus 1 in FIG. 1 generates code data set 1*a* by applying predetermined processing to input image data. The image coding apparatus 1 includes an orthogonal transformation unit 11, a quantization unit 12, an entropy coding unit 13, and a code amount control unit 14.

The orthogonal transformation unit 11 applies orthogonal transformation to input image data so that they are decomposed into frequency components. The orthogonal transformation unit 11 performs, for example, discrete cosine transformation (hereinafter referred to as "DCT") or wavelet transformation. The data corresponding to each pixel frequency-converted by the orthogonal transformation unit 11 are called "coefficient data." By decomposing image data into frequency components, the orthogonal transformation unit 11 can divide an image into frequency components ranging from visually-important low frequency components to visually-unimportant high frequency components.

The quantization unit 12 applies quantization to coefficient data in accordance with a predetermined value. The predetermined value at the quantization is called a "quantization step width." The quantization makes the dynamic range of coefficient data small, thus allowing the data amount to be reduced.

The entropy coding unit 13 converts the coefficient data quantized by the quantization unit 12 into entropy codes to eliminate their mathematical redundancy. The entropy coding unit 13 performs, for example, Huffman coding or arithmetic coding.

The code amount control unit 14 controls the code amount of code data to be generated. The code amount control unit 14 controls the code amount of code data by adjusting the value of the quantization step width when the quantization unit 12 performs the quantization. The code amount control unit 14 monitors the code amount of the code data generated by the entropy coding unit 13 and compares the value obtained by accumulating the code amount of the code data with a target code amount, thereby determining the quantization step width with respect to the coefficient data that have not been quantized. The image coding apparatus 1 in FIG. 1 adaptively controls the quantization step width to generate the code data set 1a corresponding to a predetermined target code amount.

If the obtained code data are greatly different from the target code amount in the image coding apparatus 1 in FIG. 1, the quantization step width may be changed to perform another processing. Accordingly, it is possible to obtain the code data set 1a closer to the target code amount. In this case, the coefficient data output from the orthogonal transformation unit 11 are maintained. Thus, it is only necessary to perform the processing only after the quantization step. As a result, it possible to reduce the number of processing steps. By changing the quantization step width and repeating the processing from the quantization to the entropy coding so as to make the difference between the obtained code data and the target code amount smaller than a predetermined value, it is possible to obtain the code data set 1a further closer to the target code amount. However, this method has a problem in that the time required for completing the whole process becomes long.

(Example of Image Coding Apparatus that Generates Plural Code Data Sets Each Having Different Code Amount (Part 1))

Figure 2:
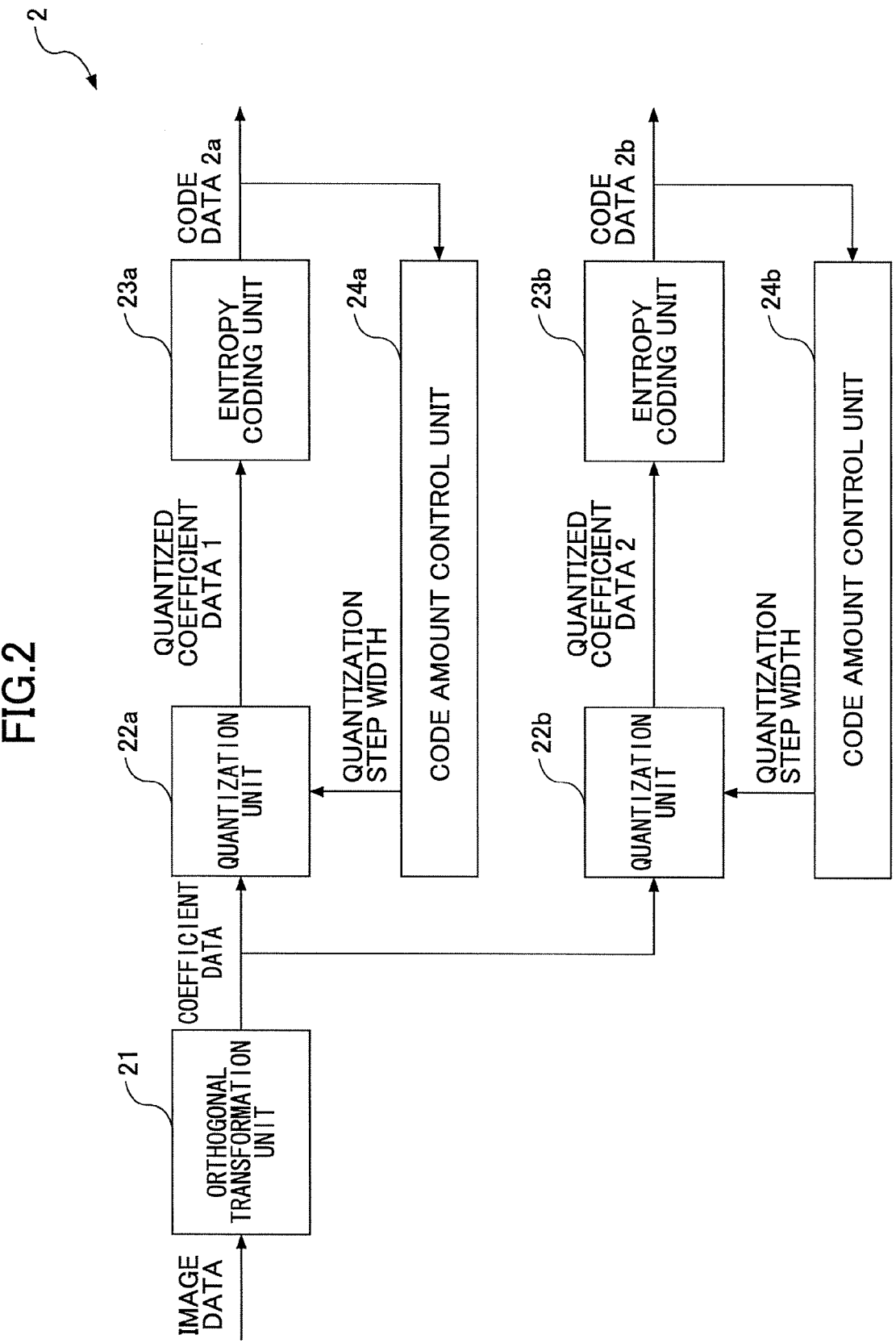
FIG. 2 is an example of an image coding apparatus that generates plural code data sets each having a different code amount (part 1)

FIG. 2 is an example of an image coding apparatus that generates plural code data sets each having a different code amount and includes some of the same parts as those of the image coding apparatus 1 in FIG. 1. The image coding apparatus 2 in FIG. 2 includes an orthogonal transformation unit 21, quantization units 22a and 22b, entropy coding units 23a and 23b, and code amount control units 24a and 24b. The processing that the respective units of the image coding apparatus 2 in FIG. 2 perform is the same as the processing that the respective units of the same name of the image coding apparatus 1 in FIG. 2 perform.

In FIG. 2, the coefficient data output from the orthogonal transformation unit 21 are input to the quantization units 22a and 22b. Here, the code amount control units 24a and 24b determine the value of the quantization step width corresponding to a different target code amount and control the code amount of code data sets 2a and 2b to be generated. Accordingly, it is possible to generate plural code data sets each having a different code amount from one image data set.

(Example of Image Coding Apparatus that Generates Plural Code Data Sets Each Having Different Code Amount (Part 2))

Figure 3:
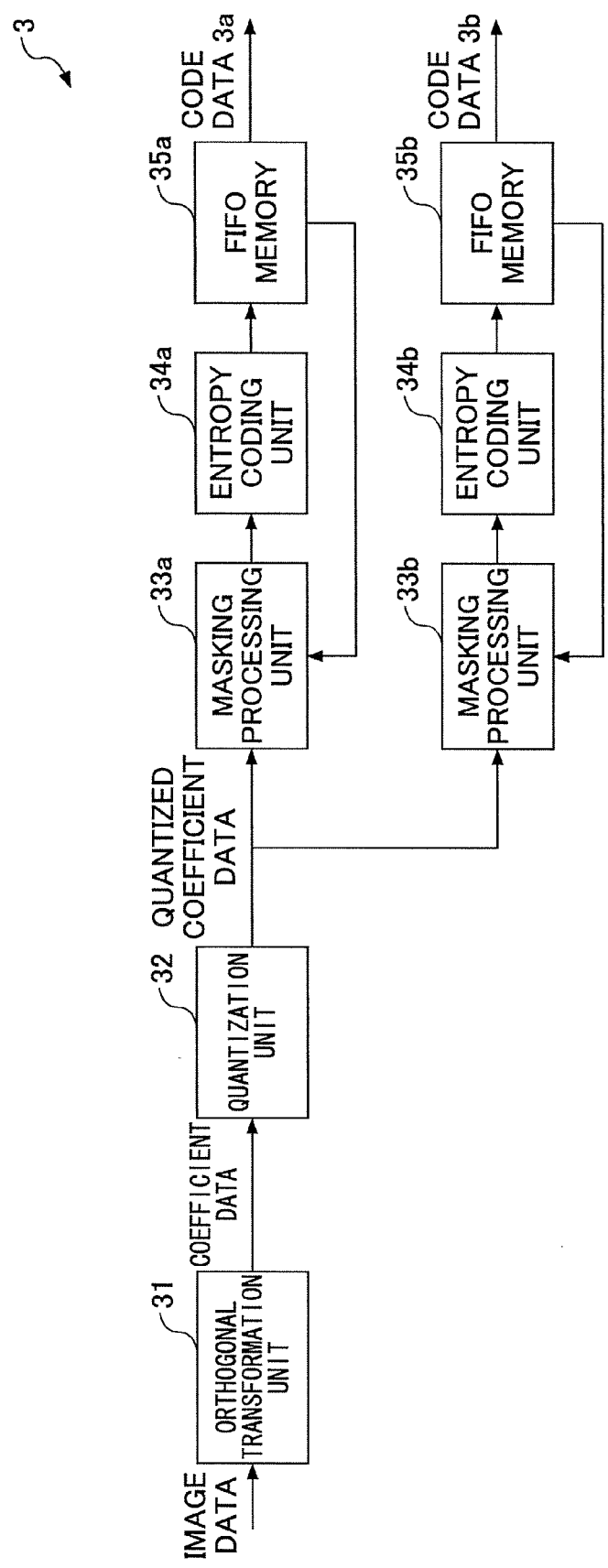
FIG. 3 is an example of an image coding apparatus that generates plural code data sets each having a different code amount (part 2)

FIG. 3 is an example of an image coding apparatus that generates plural code data sets each having a different code amount, which is different from the image coding apparatus in FIG. 2. The image coding apparatus 3 in FIG. 3 includes an orthogonal transformation unit 31, a quantization unit 32, masking processing units 33a and 33b, entropy coding units 34a and 34b, and FIFO memories 35a and 35b.

The processing that the orthogonal transformation unit 31, the quantization unit 32, and the entropy coding units 34a and 34 perform is the same as the processing that the respective units of the same name in FIG. 1 perform. Therefore, a description of the processing by the units in FIG. 3 is omitted here.

The masking processing units 33a and 33b perform masking processing in which the value of coefficient data corresponding to a predetermined frequency component among quantized coefficient data is made "0." Accordingly, the "redundant" parts eliminated by the entropy coding units 34a and 34b are increased, thereby making it possible to reduce the code amount of code data to be generated. The coefficient data to which the masking processing units 33a and 33b apply the masking processing are determined by the code amount of the code data accumulated in the FIFO memories 35a and 35b.

In other words, if the code amount of the code data accumulated in the FIFO memory 35a or 35b increases, the coefficient data to which the masking processing unit 33a or 33b, respectively, applies the masking processing are increased. For example, the masking processing is preferentially applied in the order of the coefficient data corresponding to high frequency components, thereby making it possible to preferentially mask the coefficient data that have less influence on the quality of a decoded image corresponding to code data to be generated. As a result, degradation of the quality of a decoded image can be prevented.

Note that the smaller the difference between a decoded image and an image (hereinafter referred to as an "original image") corresponding to input image data is, the higher the quality of the decoded image becomes. On the other hand, the greater the difference between a decoded image and an original image is, the lower the quality of the decoded image becomes. The difference between an original image and a decoded image may be represented by a value based on either a subjective evaluation or an objective evaluation measured by a predetermined method.

The FIFO memories 35a and 35b accumulate the code data output from the entropy coding units 34a and 34b, respectively. The FIFO memories 35a and 35b can calculate and sum up the corresponding code amounts of code data to be output.

First Embodiment (Example of Image Coding Apparatus that Controls Code Amount by Truncating Part of Entropy Codes (Part 1))

Figure 4:
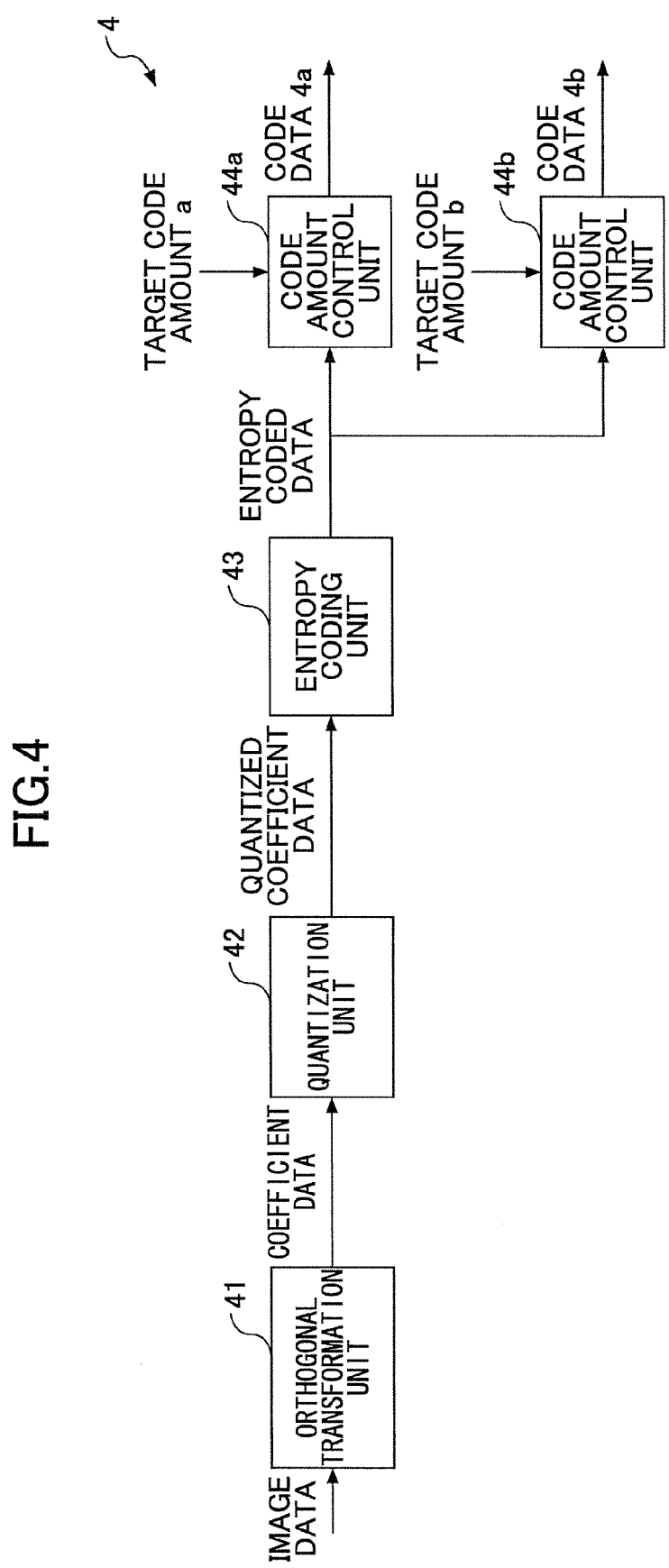
FIG. 4 is an example of an image coding apparatus that controls a code amount by truncating a part of entropy codes according to an embodiment of the present invention (part 1)

FIG. 4 is an example of an image coding apparatus that generates plural code data sets each having a different code amount and controls the code amount by truncating a part of entropy codes according to an embodiment of the present invention. The image coding apparatus 4 in FIG. 4 includes an orthogonal transformation unit 41, a quantization unit 42, an entropy coding unit 43, and code amount control units 44a and 44b.

The processing that the orthogonal transformation unit 41, the quantization unit 42, and the entropy coding unit 43 perform is the same as the processing that the respective units of the same name in FIG. 1 perform. Therefore, a description of the processing by the units in FIG. 4 is omitted here.

The code amount control units 44a and 44b generate code data corresponding to target code amounts "a" and "b," respectively. The code amount control unit 44a compares the specified target code amount "a" with the entropy codes input from the entropy coding unit 43 and determines the entropy codes to be truncated from among the input entropy codes so as to make the code amount satisfy a predetermined relationship with the prescribed target code amount "a." Then, the code amount control unit 44a generates code data set 4a from the remaining entropy codes.

Where an entropy code is truncated in a predetermined unit, the predetermined relationship refers to a relationship in which the code amount of code data corresponds to the target code amount "a," a relationship in which the code amount of code data is set at a maximum value not greater than the target code amount "a," or a relationship in which the code amount of code data is set at a minimum value not below the target code amount "a." Furthermore, the predetermined relationship may also refer to a relationship in which the difference between the code amount of code data and the target code amount "a" is set at a predetermined value or smaller. Note that the code amount of the entropy codes not to be truncated may be used instead of the code amount of code data so as to determine if the code amount meets the predetermined relationship with the target code amount "a."

Furthermore, it is desirable that the predetermined unit for truncating entropy codes be such that entropy codes are completed in code data at the time of decoding the code data. Accordingly, for example, when the image coding method prescribed in the JPEG-2000 (ISO/ICE 15444-1) standard is used, the entropy codes to be truncated may be specified by units such as a precinct, a code block, the level of a sub-band, the frequency of a sub-band, a component, a bit plane, a pass for performing entropy coding processing, a layer, and coefficient data corresponding to a pixel, or a combination thereof.

According to the embodiment of the present invention, the group of entropy codes is called a "cluster." The cluster may be the same as the "predetermined unit" for truncating the entropy codes.

The processing that the code amount control unit 44b performs is the same as the processing that the code amount control unit 44a performs. The code amount control unit 44b generates code data set 4b corresponding to a target code amount "b" different from the target code amount "a."

With the above configuration, plural code data sets each having a different code amount are generated from one entropy coded data set resulting from the processing that the orthogonal transformation unit 41, the quantization unit 42, and the entropy coding unit 43 perform in this order. Accordingly, it is possible to generate plural code data sets each having a different code amount without performing the processing from the orthogonal transformation to the entropy coding plural times or without having the plural configurations from the orthogonal transformation unit 41 to the entropy coding unit 43. As a result, plural code data sets each having a different code amount can be generated promptly with a simple configuration.

It is needless to say that both of the code data sets generated by the image coding apparatus 4 according to the embodiment of the present invention can be decoded by the same decoding method, although they are different in their code amounts. Therefore, it is not necessary to provide a decoder corresponding to the different code data.

(Example of Image Coding Apparatus that Controls Code Amount by Truncating Part of Entropy Codes (Part 2))

Figure 5:
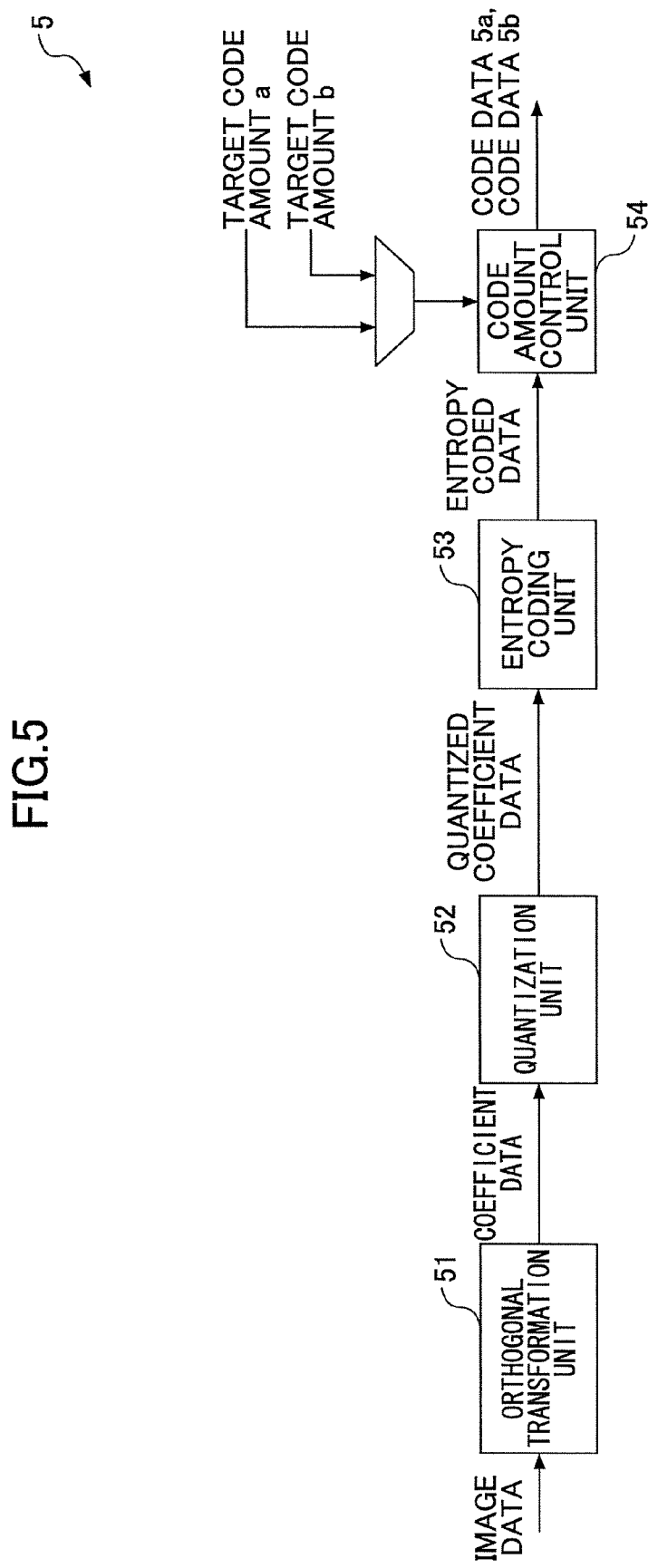
FIG. 5 is an example of an image coding apparatus that controls a code amount by truncating a part of entropy codes (part 2)

FIG. 5 is an example of an image coding apparatus that generates plural code data sets each having a different code amount and controls the code amount by truncating a part of entropy codes according to an embodiment of the present invention. This image coding apparatus is different from the image coding apparatus in FIG. 4. The image coding apparatus 5 in FIG. 5 includes an orthogonal transformation unit 51, a quantization unit 52, an entropy coding unit 53, and a code amount control unit 54.

The processing that the orthogonal transformation unit 51, the quantization unit 52, and the entropy coding unit 53 perform is the same as the processing that the respective units of the same name in FIG. 4 perform. Therefore, a description of the processing by the units in FIG. 5 is omitted here.

The code amount control unit 54 generates plural code data sets corresponding to target code amounts "a" and "b." For example, if the target code amount "a" is greater than the target code amount "b," the code amount control unit 54 first compares the prescribed target code amount "a" with the entropy codes input from the entropy coding unit 53 and determines the entropy codes to be truncated from among the input entropy codes so as to make the code amount satisfy the predetermined relationship with the prescribed target code amount "a." Then, the code amount control unit 54 generates code data set 5a from the remaining entropy codes.

In addition, when generating the code data set corresponding to the target code amount "a," the code amount control unit 54 determines the entropy codes to be truncated from among those that have not been truncated so as to make the code amount satisfy the predetermined relationship with the target code amount "b." Then, the code amount control unit 54 generates code data set 5b from the remaining entropy codes. Accordingly, the processing for determining the entropy codes to be truncated can be partially made in common between the processing for the target code amount "a" and that for the target code amount "b," thus allowing the image coding apparatus 5 to perform the processing faster than the image coding apparatus 4 in FIG. 4. Moreover, since the processing is performed by one code amount control unit, the configuration of the image coding apparatus 5 can be simplified.

Note that the relationship between the target code amount and the code amount of the code data sets determined by the code amount control unit 54 is the same as that determined by the code amount control unit 44a in FIG. 4, and the units of the entropy codes to be truncated by the code amount control unit 54 are also the same as those to be truncated by the code amount control unit 44a in FIG. 4. Therefore, a description thereof is omitted here.

It is needless to say that both of the code data sets generated by the image coding apparatus 5 according to the embodiment of the present invention can be decoded by the same decoding method, although they are different in their code amounts. Therefore, it is not necessary to provide a decoder corresponding to each of the different code data sets.

(Functional Configuration Example of Image Coding Apparatus According to Embodiment of the Present Invention)

Figure 6:
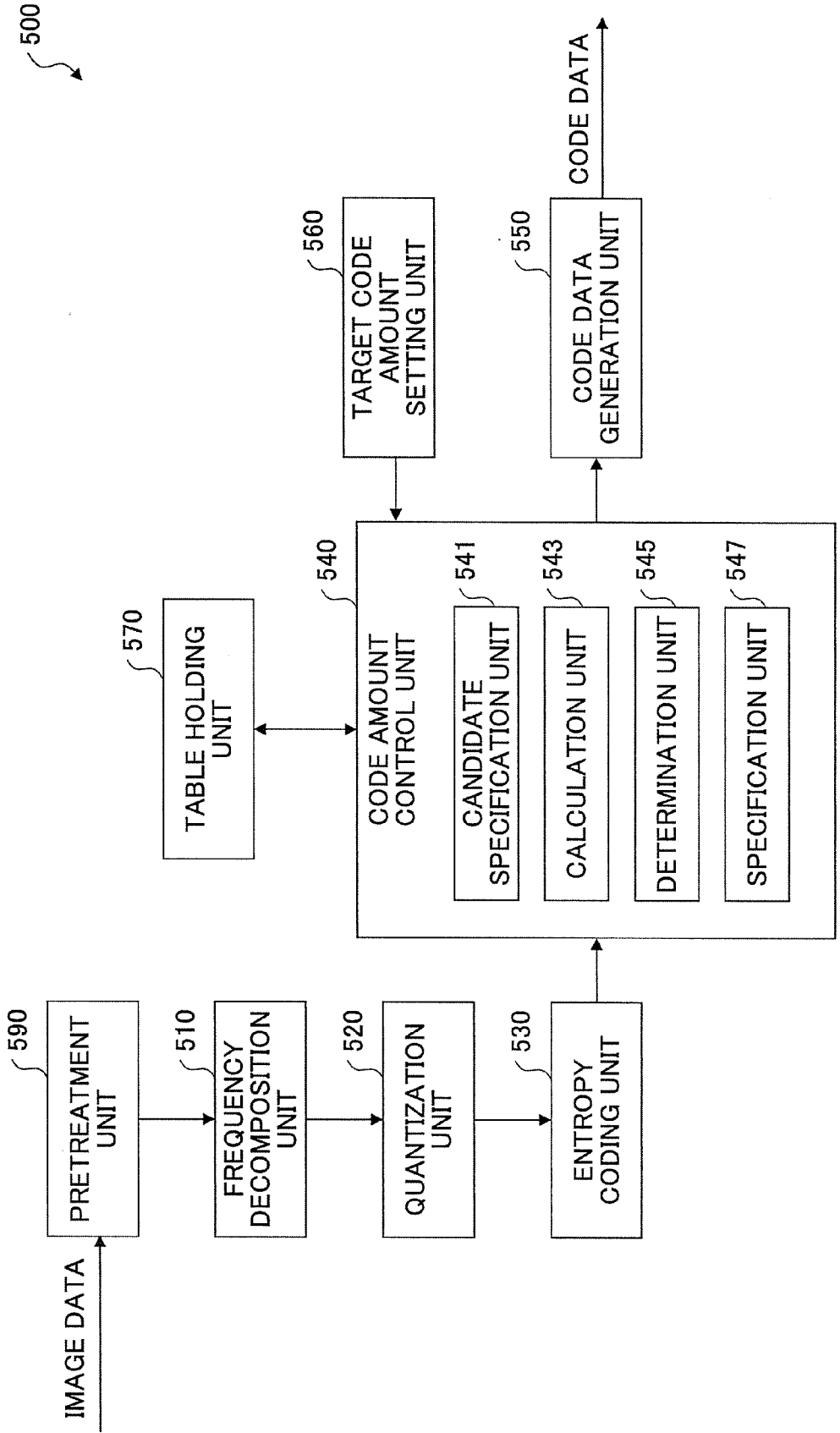
FIG. 6 is a diagram for illustrating a functional configuration example of an image coding apparatus according to an embodiment of the present invention.

FIG. 6 is a diagram for illustrating a functional configuration example of an image coding apparatus according to an embodiment of the present invention. The image coding apparatus 500 in FIG. 6 includes an entropy coding unit 530, a code amount control unit 540, a code data generation unit 550, and a target code amount setting unit 560. The image coding apparatus 500 may further include a frequency decomposition unit 510, a quantization unit 520, a table holding unit 570, and a pretreatment unit 590.

The code amount control unit 540 controls the code amount to generate plural code data sets each having a different code amount. For example, the code amount control unit 540 determines and specifies the entropy codes to be truncated from among the entropy codes input from the entropy coding unit 530. The code amount control unit 540 includes a candidate specification unit 541, a calculation unit 543, a determination unit 545, and a specification unit 547.

The candidate specification unit 541 specifies a candidate for the entropy codes to be truncated. The candidate specification unit 541 specifies entropy codes in a predetermined unit. When the image coding method prescribed in the JPEG-2000 standard is used, the entropy codes to be truncated may be specified by units such as a precinct, a code block, the level of a sub-band, the frequency of a sub-band, a component, a bit plane, a pass for performing entropy coding processing, a layer, and conversion data corresponding to a pixel, or a combination thereof.

Furthermore, when the image coding method prescribed in the MPEG-4/AVC standard (ISO/IEC 14496-10) is used, the predetermined unit may refer to units such as a slice, a macroblock, a block, a bit plane, and conversion data corresponding to a pixel, or a combination thereof.

If the predetermined unit becomes identical to the units of other coding processing including entropy coding processing, the completion of entropy codes contained in code data can be made possible. Note that the completion of entropy codes means that all the entropy codes contained in code data can be decoded or the image corresponding to the predetermined unit can be reconfigured by decoded data.

The candidate specification unit 541 specifies a candidate for the entropy codes to be truncated in the order of making a lesser contribution to the quality of a decoded image corresponding to code data to be generated. The order of making a lesser contribution to the quality of a decoded image is determined, for example, in the following manner. The color difference information makes a lesser subjective contribution to the quality of a decoded image than the luminance information. Based on this, it is determined that the components Cb and Cr make a lesser contribution to the quality of a decoded image than the component Y.

Furthermore, where wavelet transformation is performed prior to entropy coding processing, low levels of sub-bands make a lesser subjective contribution to the quality of a decoded image than high levels of sub-bands. In other words, it is determined that the lower the sub-band level is, the lesser the contribution to the quality of a decoded image is made. Furthermore, in the case of wavelet transformation, high frequency components make a lesser contribution to the quality of a decoded image than low frequency components. Accordingly, a candidate for the entropy code to be truncated may be specified such that the high frequency components are preferentially truncated rather than the low frequency components.

The calculation unit 543 calculates the sum of the code amount of other entropy codes excluding the candidate for the entropy code to be truncated specified by the candidate specification unit 541. Furthermore, the calculation unit 543 may calculate the sum of the code amount of other entropy codes and codes that are not entropy codes. When the image coding method prescribed in the JPEG-2000 standard is used, the codes that are not entropy codes refer to predetermined markers, marker headers, start codes, and the like contained in code data and header information and the like added to each predetermined code unit. Accordingly, the code amount can be calculated more accurately.

The determination unit 545 determines if the code amount calculated by the calculation unit 543 and a target code amount satisfy a predetermined relationship. Where an entropy code is truncated in a predetermined unit, the predetermined relationship refers to a relationship in which the calculated code amount corresponds to the target code amount, a relationship in which the calculated code amount is set at a maximum value not greater than the target code amount, or a relationship in which the calculated code amount is set at a minimum value not below the target code amount. Furthermore, the predetermined relationship may also refer to a relationship in which the difference between the calculated code amount and the target code amount is set at a predetermined value or smaller.

The specification unit 547 specifies the candidate for the entropy code to be truncated specified by the candidate specification unit 541 as the entropy code to be truncated if the determination unit 543 determines that the calculated code amount and the target code amount satisfy the predetermined relationship. Accordingly, the entropy codes that are not to be included in the code data generated by the code data generation unit 55 are determined.

The code data generation unit 550 generates code data excluding the entropy codes specified by the code amount control unit 540 from among the entropy codes generated by the entropy coding unit 530. The code data generation unit 550 generates code data, for example, by generating packets including entropy codes and adding header data of the information related to the packets or the like thereto.

The entropy coding unit 530 applies entropy coding processing to the data input to the entropy coding unit 530. The entropy coding processing refers, for example, to Huffman coding or arithmetic coding. The entropy coding unit 530 may change the arrangement order of input data to a predetermined order so as to perform the entropy coding processing. For example, the entropy coding unit 530 may perform the entropy coding processing for each bit plane constituting input data. Note that the bit plane refers to a binary plane obtained by extracting the values of bits the same in position from respective data of data group having a two-dimensional array structure.

The target code amount setting unit 560 sets a target code amount for use in determining the entropy codes to be truncated by the code amount control unit 540. The target code amount setting unit 560 may use the code amount input from an input unit or the like (not shown) as a target code amount. Furthermore, the target code amount setting unit 560 may be a register that holds target code amounts set in advance.

The table holding unit 570 holds a table in which information related to contribution to the quality of a decoded image corresponding to code data is made to correspond to each cluster having different entropy codes. The information related to the contribution to the quality of a decoded image may be represented by a relative order between clusters showing the degradation degree of the quality of a decoded image due to the exclusion of an entropy code from the code data. Furthermore, it may be represented by making a priority of truncating an entropy code correspond to each cluster based on the degradation degree of the quality of a decoded image due to the exclusion of the entropy code from the code data.

When the image coding method prescribed in the JPEG-2000 standard is used, the information related to the contribution to the quality of a decoded image may refer to the number of passes to be truncated corresponding to components, sub-bands, and/or levels. Accordingly, it is possible to truncate entropy codes corresponding to the number of passes previously specified in the table at the components, the sub-bands, and/or the levels. Furthermore, a suitable combination of the number of passes to be truncated is previously specified in the tables, thereby making it possible to simplify and accelerate the processing for generating code data.

Where the entropy codes to be truncated are specified according to the number of passes, it is designed such that entropy codes are truncated by a specified number of passes counted from the one on the LSB side of coefficient data. On the other hand, where the entropy codes not to be truncated are specified according to the number of passes, it is designed such that entropy codes are not truncated by a specified number of passes counted from the one on the MSB side of coefficient data. Accordingly, it is possible to truncate entropy codes in the order from the entropy code corresponding to the pass making a lesser contribution to the quality of a decoded image.

The pretreatment unit 590 applies a predetermined pretreatment to the image data input to the image coding apparatus 500. For example, the pretreatment unit 590 converts the color space of image data. Furthermore, the pretreatment unit 590 may shift a level to subtract half the value of a dynamic range from the value of each pixel of image data. Moreover, the pretreatment unit 590 may perform various processes to convert image data into data suitable for compression processing.

The frequency decomposition unit 510 applies transformation such as orthogonal transformation to the image data to which the pretreatment unit 590 applies the pretreatment so that they are decomposed into frequency components. The frequency decomposition unit 510 decomposes the frequency of image data, for example, by DCT or wavelet transformation.

The quantization unit 520 quantizes based on a quantization step width the conversion data obtained by converting the frequency of image data with the frequency decomposition unit 510. The quantization unit 520 may perform the quantization based on either the quantization step width specified in advance or the characteristics of the image data acquired by a unit (not shown) that acquires the characteristics of image data. Furthermore, the quantization unit 520 may adaptively change the quantization step width based on the code amount of each data set to be generated by the quantization unit 520, the entropy coding unit 530, the code amount control unit 540, or the code data generation unit 550.

(Example of Image Coding Apparatus that Realizes Image Coding Method of the Present Invention Using JPEG-2000 Coding Method (Part 1))

Figure 7:
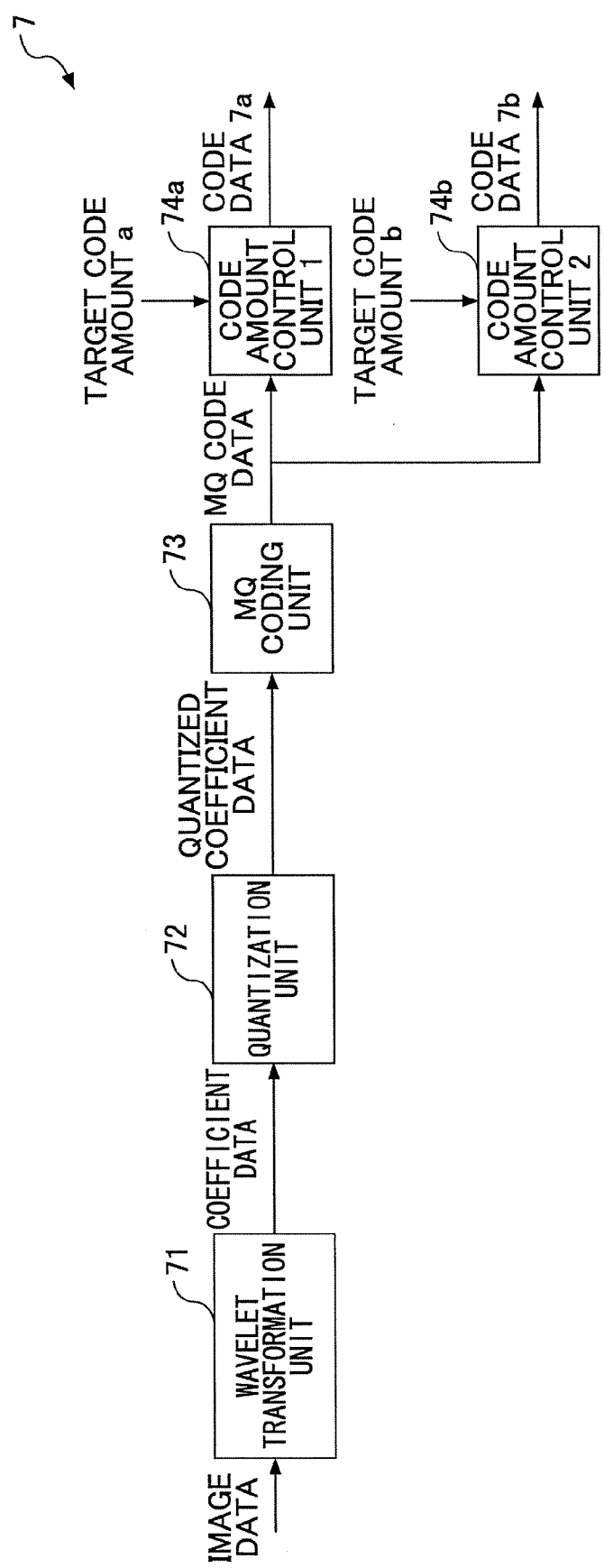
FIG. 7 is an example of an image coding apparatus that realizes the image coding method of the present invention using the JPEG-2000 coding method (part 1)

FIG. 7 is an example of an image coding apparatus that realizes the image coding method of the present invention using the JPEG-2000 coding method and has the same configuration as that of the image coding apparatus 4 in FIG. 4. The image coding apparatus 7 in FIG. 7 includes a wavelet transformation unit 71, a quantization unit 72, an MQ coding unit 73, and code amount control units 74a and 74b.

Figure 8:
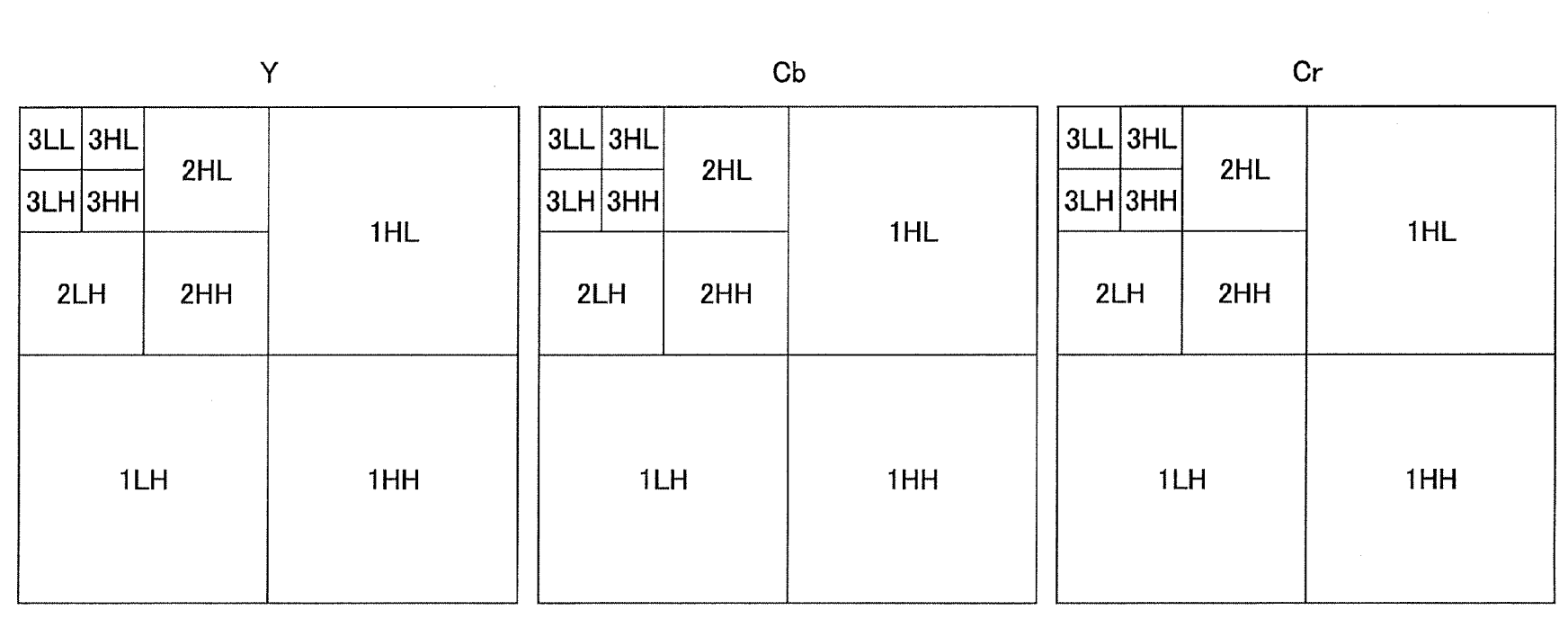

The wavelet transformation unit 71 performs wavelet transformation as orthogonal transformation. FIG. 8 shows a conceptual diagram of the coefficient data transformed by the wavelet transformation unit 71.

FIG. 8 is an example obtained by applying wavelet transformation to each component in the image data represented by the color space composed of three components Y, Cb, and Cr. In FIG. 8, sub-band transformation is first applied to each component Y, Cb, and Cr of input image data to obtain four sub-bands 1LL, 1LH, 1HL, and 1HH.

Here, "L" represents a low frequency component obtained through a low pass filter and "H" represents a high frequency component obtained through a high pass filter. Furthermore, "LL" is a result obtained by applying low pass filter processing to horizontal and vertical directions and "LH" is a result obtained by applying low pass filter processing and high pass filter processing to the horizontal direction and the vertical direction, respectively. Furthermore, "HL" is a result obtained by applying high pass filter processing and low pass filter processing to the horizontal direction and the vertical direction, respectively and "HH" is a result obtained by applying high pass filter processing to the horizontal and vertical directions.

Then, sub-band processing is further applied to 1LL to obtain four components 2LL, 2LH, 2HL, and 2HH. Finally, sub-band processing is further applied to 2LL to obtain four components 3LL, 3LH, 3HL, and 3HH.

Here, numbers 1 through 3 corresponding to the number of times for applying sub-band processing to image data are called "levels" of sub-bands. In FIG. 8, the sub-bands up to level 3 are obtained.

Referring back to FIG. 7, the quantization unit 72 applies quantization processing to each component and the coefficient data of each level obtained by wavelet transformation in FIG. 8. Note that the quantization processing may be omitted.

The MQ coding unit 73 applies arithmetic coding processing to the quantized coefficient data output from the quantization unit 72. The MQ coding unit 73 generates an MQ code in accordance with the MQ-Coder algorithm as an arithmetic coding method. The MQ-Coder algorithm can perform coding processing more efficiently than Huffman coding. On the other hand its coding processing is complicated, thus requiring a large number of steps. In addition, if the MQ coding unit 73 is realized as a circuit, the circuit becomes disadvantageously large in size.

In view of this, the image coding apparatus 7 according to an embodiment of the present invention is designed to have a configuration that generates one code data set from the wavelet transformation unit 71 to the MQ coding unit 73 and has plural parts related to the code amount control. Accordingly, the image coding apparatus 7 can be made simple in structure when realized as an apparatus or a circuit.

The code amount control units 74a and 74b truncate MQ codes from among those generated by the MQ coding unit 73 in the order of making a lesser contribution to the quality of a decoded image corresponding to code data to be generated. Accordingly, the code amount control units 74a and 74b generate code data set "a" and code data set "b" satisfying the predetermined relationship with a target code amount "a" and a target code amount "b," respectively. The processing that the code amount control units 74a and 74b perform is the same as the processing that the code amount control units 44a and 44b in FIG. 4 perform. Therefore, a description of the processing by the units in FIG. 7 is omitted here.

(Example of Code Data Generated by Image Coding Method According to Embodiment of the Present Invention (Part 1))

Figure 9A:
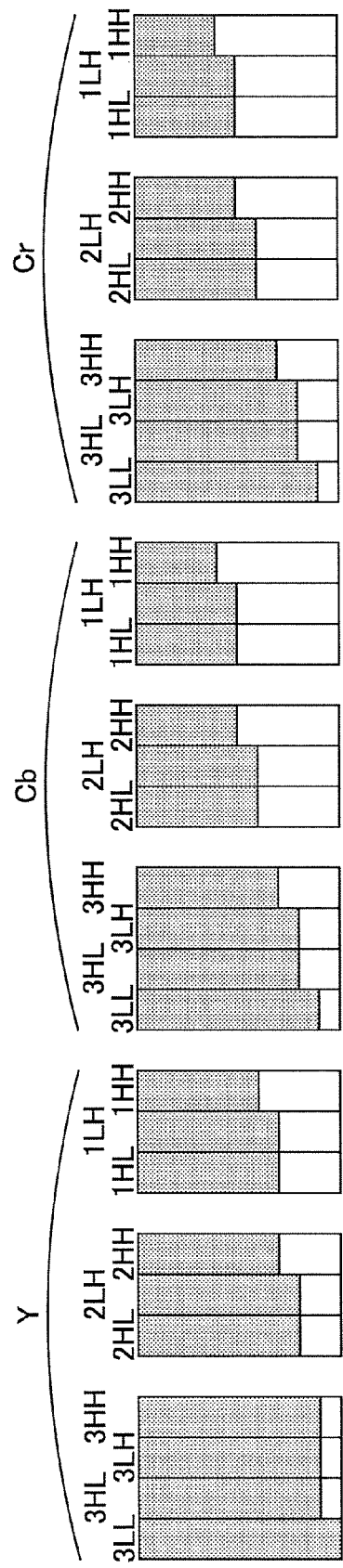
FIG. 9 is an example of code data generated by an image coding method according to an embodiment of the present invention (part 1)
Figure 9B:
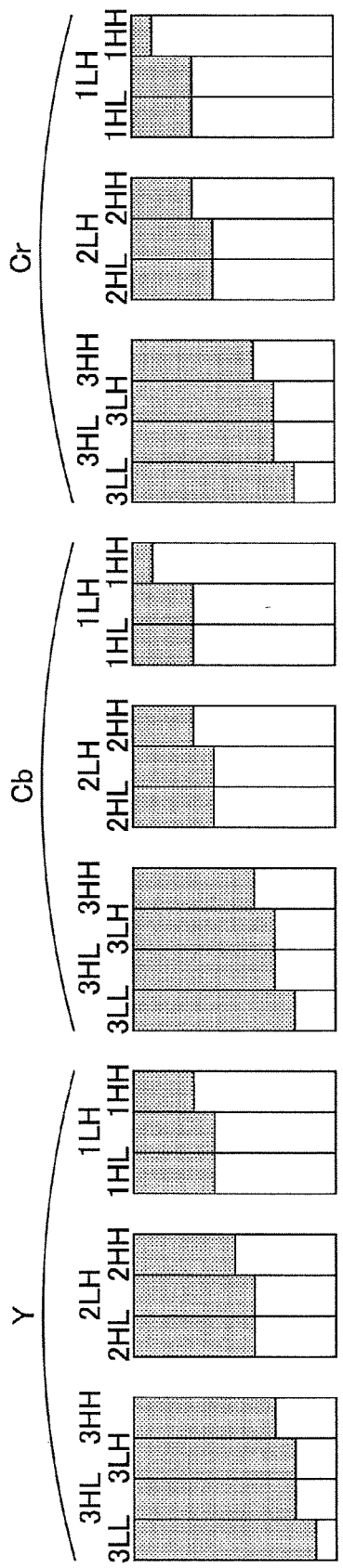

FIG. 9 is an example of the code data generated by the image coding method according to an embodiment of the present invention, concurrently showing the code data to be generated by the image coding apparatus 7 in FIG. 7. In FIGS. 9A and 9B, hatching parts represent MQ codes that are not truncated and white parts represent MQ codes that are truncated. In FIG. 9A, for example, 3LL of the component Y is included in code data without being truncated at all.

FIG. 9A corresponds to the code data 7a in FIG. 7, showing the MQ codes corresponding to a predetermined coding pass truncated at the levels for each component Y, Cb, and Cr. At level 3, 3LL of the component Y is not truncated at all, while 3HL, 3LH, and 3HH are partially truncated in their passes. At level 2, the number of passes to be truncated is greater than that to be truncated at level 3. At level 1, the number of passes to be truncated is further greater than that to be truncated at level 2. Accordingly, 3LL making a greater contribution to the quality of a decoded image corresponding to code data is entirely coded, while the MQ codes at levels 1 and 2 making a lesser contribution to the quality of a decoded image corresponding to code data are truncated in an amount greater than the MQ codes at level 3. As a result, the quality of a decoded image can be suitably controlled.

At level 2, for example, the number of passes to be truncated is the greatest in 2HH and the number of passes to be truncated in 2LH and 2HL is smaller than that in 2HH. In this manner, the passes of the high frequency components making a lesser contribution to the quality of a decoded image corresponding to decoded data are preferentially truncated, thereby preventing degradation of the quality of the decoded image.

Note that the contribution to the quality of a decoded image corresponding to decoded data may be represented by a difference occurring in the quality of a decoded image depending on whether MQ codes are included in code data.

The components Cb and Cr are the same as the component Y in their tendency from level 3 to level 1. In other words, the number of passes to be truncated is the smallest at level 3 and is the largest at level 1. Moreover, the number of passes to be truncated in the components Cb and Cr is greater than that in the component Y. Accordingly, the MQ codes of the component Y having a large influence on the subjective quality of a decoded image are left in large amounts and the MQ codes of the components having a small influence on the subjective quality of a decoded image are truncated in large amounts. As a result, the quality of a decoded image can be suitably controlled.

FIG. 9B corresponds to the code data set 7b in FIG. 7. Note that the code data set 7b has code data smaller in code amount than the code data set 7a. In the same manner as FIG. 9A, FIG. 9B shows the passes truncated at the level for each component Y, Cb, and Cr in white parts.

As is apparent from the comparison between FIGS. 9A and 9B, the MQ codes in the code data set 7b having a lesser code amount of code data are truncated in greater amounts than those in the code data set 7a. In this manner, the amounts of the MQ codes to be truncated are made different between the code data sets 7a and 7b, thereby making it possible to generate plural code data sets each having a different code amount.

(Example of Information Table Relating to Contribution to Quality of Decoded Image Corresponding to Code Data)

FIG. 10 is an example of an information table related to the contribution to the quality of a decoded image corresponding to code data. The table in FIG. 10 corresponds to the image coding method according to the JPEG-2000 standard. In the image coding method, entropy coding processing is applied to each level in components. In the entropy coding processing, plural passes are included in one level. The table in FIG. 10 represents the entropy codes to be truncated in the number of passes.

FIG. 10 shows the number of passes of the entropy codes to be truncated in each component Y, Cb, and Cr with respect to seven indices from INDEX 0 through INDEX 6. The number of passes of the entropy codes to be truncated is "0" in all the components at INDEX 0 and is "1" in the sub-band of level 1HH of the component Cb at INDEX 1. The number of passes of the entropy codes to be truncated is incremented one by one from INDEX 2 through INDEX 6.

In FIG. 10, the number of passes of the entropy codes to be truncated is alternately incremented in the order of Cb, Cr, Cb, and Cr and is incremented in the order of HH, LH, HL, and LL in one component. Moreover, the number of passes of the entropy codes to be truncated may be incremented in the order of low levels of sub-bands.

The information related to the contribution to the quality of a decoded image corresponding to decoded data may be represented in the order of truncating entropy codes for each component or for each level of the sub-band, besides the number of passes of the entropy codes to be truncated as shown in FIG. 10. Furthermore, other representation methods may be also used.

(Example of Image Coding Apparatus that Realizes Image Coding Method of the Present Invention Using JPEG-2000 Coding Method)

Figure 11:
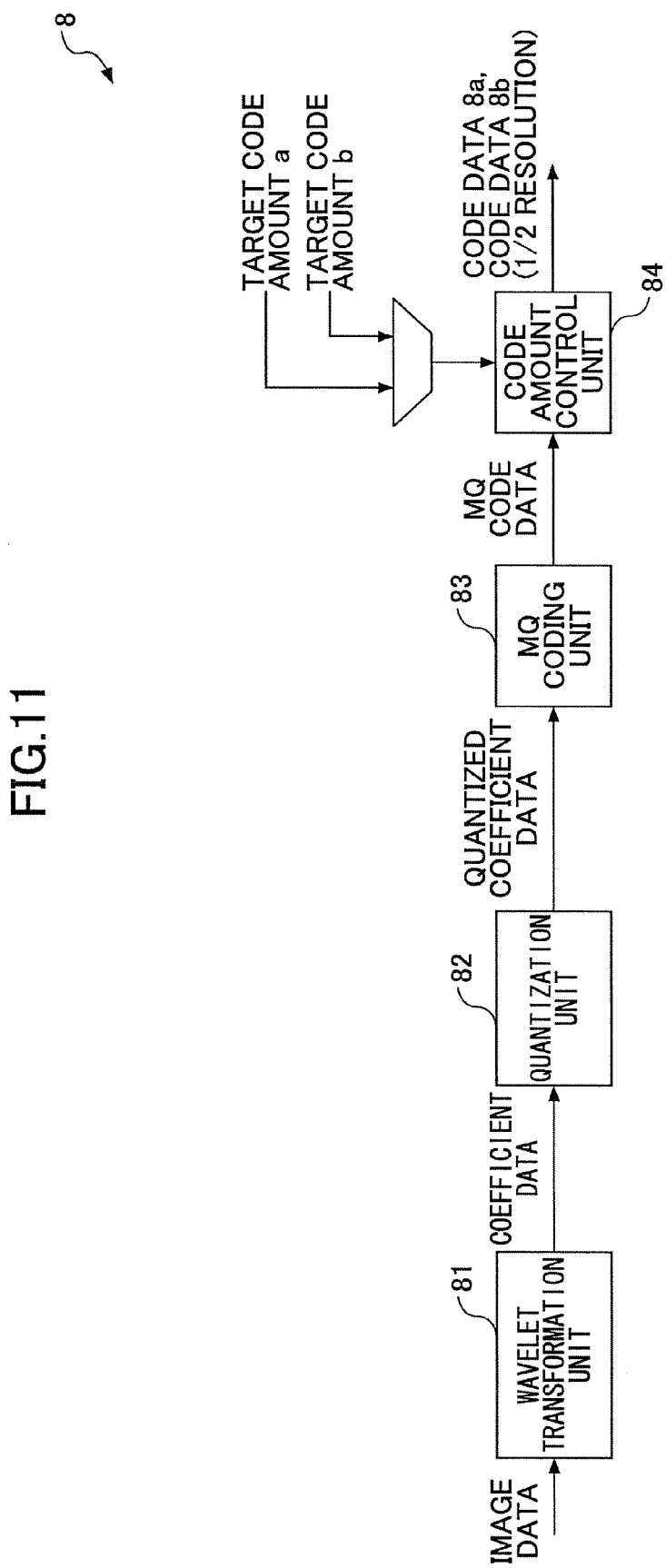
FIG. 11 is an example of an image coding apparatus that realizes the image coding method of the present invention using the JPEG-2000 coding method (part 2)

FIG. 11 is an example of an image coding apparatus that realizes the image coding method of the present invention using the JPEG-2000 coding method, which is different from the image coding apparatus of FIG. 7 in configuration. The image coding apparatus 8 in FIG. 11 includes a wavelet transformation unit 81, a quantization unit 82, an MQ coding unit 83, and a code amount control unit 84. The processing that the wavelet transformation unit 81, the quantization unit 82, and the MQ coding unit 83 perform is the same as the processing that the respective units of the same name in FIG. 7 perform. Therefore, a description of the processing by the units in FIG. 11 is omitted here.

The code amount control unit 84 truncates MQ codes from among those generated by the MQ coding unit 83 in the order of making a lesser contribution to the quality of a decoded image corresponding to code data to be generated. Accordingly, the code amount control unit 84 generates code data set "a" and code data set "b" satisfying the predetermined relationship with a target code amount "a" and a target code amount "b," respectively. The processing that the code amount control unit 84 performs is the same as the processing that the code amount control unit 54 in FIG. 5 performs. Therefore, a description of the processing by the units in FIG. 11 is omitted here.

(Example of Code Data Generated by Image Coding Method According to Embodiment of the Present Invention (Part 2))

Figure 12:
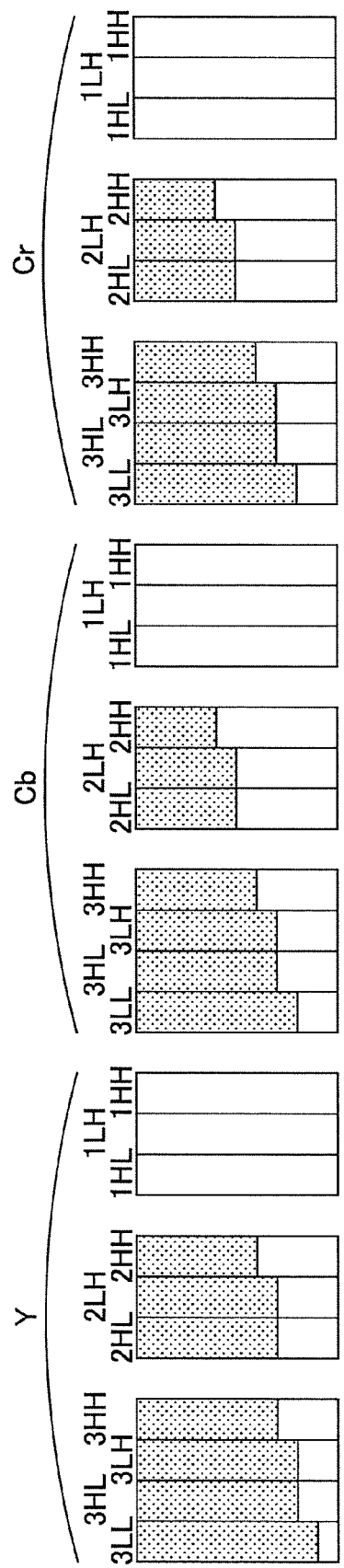
FIG. 12 is an example of code data generated by the image coding method according to an embodiment of the present invention (part 2)

FIG. 12 is an example of the code data generated by the image coding method according to an embodiment of the present invention, concurrently showing the code data generated by the image coding apparatus 11 in FIG. 11. In the same manner as FIG. 9, hatching parts represent MQ codes that are not truncated and white parts represent MQ codes that are truncated in FIG. 12.

FIG. 12 corresponds to the code data 8b in FIG. 11. As shown in FIG. 12, MQ codes corresponding to all the passes at level 1 are truncated for each component Y, Cb, and Cr. Accordingly, it is possible to generate code data corresponding to a decoded image having a resolution one-half the original image input to the image coding apparatus 8. In other words, the resolution of a decoded image can be changed to correspond to a target code amount.

(Configuration Example of Image Coding Circuit According to Embodiment of the Present Invention)

Figure 13:
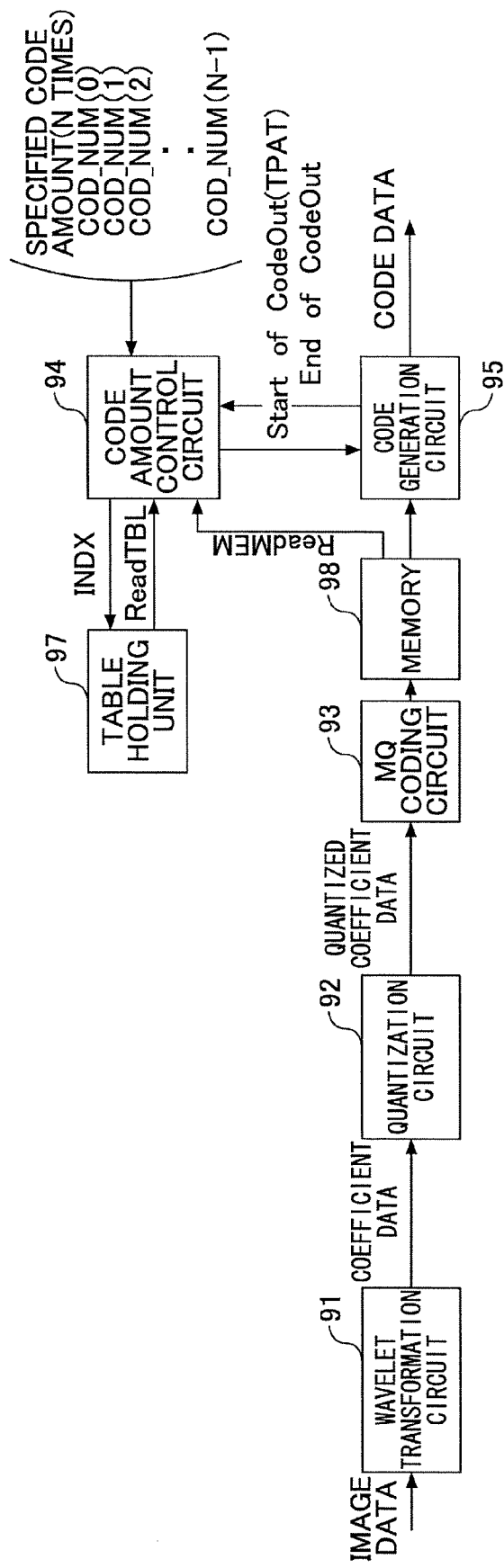
FIG. 13 is a configuration example of an image coding circuit according to an embodiment of the present invention.

FIG. 13 is a configuration example of an image coding circuit 9 according to an embodiment of the present invention. The image coding circuit in FIG. 13 includes a wavelet transformation circuit 91, a quantization circuit 92, an MQ coding circuit 93, a code amount control circuit 94, a code generation circuit 95, a table holding unit 97, and a memory 98. Note that the table holding unit 97 may be an external memory provided outside the image coding circuit 9 of the present invention.

The wavelet transformation circuit 91 applies wavelet transformation to input image data so as to output coefficient data. The quantization circuit 92 quantizes the coefficient data with a predetermined quantization step width and outputs the same. The MQ coding circuit 93 applies MQ coding processing to the quantized coefficient data output from the quantization circuit 92. The MQ coding circuit performs the processing for each bit plane of the input quantized coefficient data to output MQ codes.

The memory 98 stores the MQ codes generated by the MQ coding circuit 93. The memory 98 serves as an external memory connected to the image coding circuit 9. Furthermore, the memory 98 may serve as an internal memory of the image coding circuit 9.

The code amount control circuit 94 determines the MQ codes to be truncated from among those stored in the memory 98. For example, the code amount control circuit 94 determines the MQ codes to be truncated or the cluster of MQ codes based on the information related to the contribution to the quality of a decode image corresponding to code data, which are stored in the table holding unit 97.

In controlling the code amount, the code amount control circuit 94 specifies N target code amounts from COD_NUM (0) to COD_NUM (N−1). Accordingly, the image coding circuit 9 can generate N sets of code data each having a different target code amount from one image data set. Note that the target code amount may be stored in a predetermined register or the like.

The code generation circuit 95 generates code data excluding the MQ codes determined to be truncated by the code amount control circuit 94. In other words, the code generation circuit 95 generates code data obtained by adding predetermined header information and the like to the MQ codes excluding the MQ codes determined to be truncated. Accordingly, the MQ codes specified by the code amount control unit 94 are "truncated" from the code data to be generated. The code data excluding the MQ codes determined to be truncated are generated to correspond to each of the N target code amounts. As a result, N sets of code data are output from the code generation circuit 95.

The table holding unit 97 may be a memory provided outside the image coding circuit 9. Furthermore, the table holding unit 97 may be a register provided either outside or inside the image coding circuit 9.

(Flowchart for Illustrating Image Coding Method According to Embodiment of the Present Invention)

Figure 14:
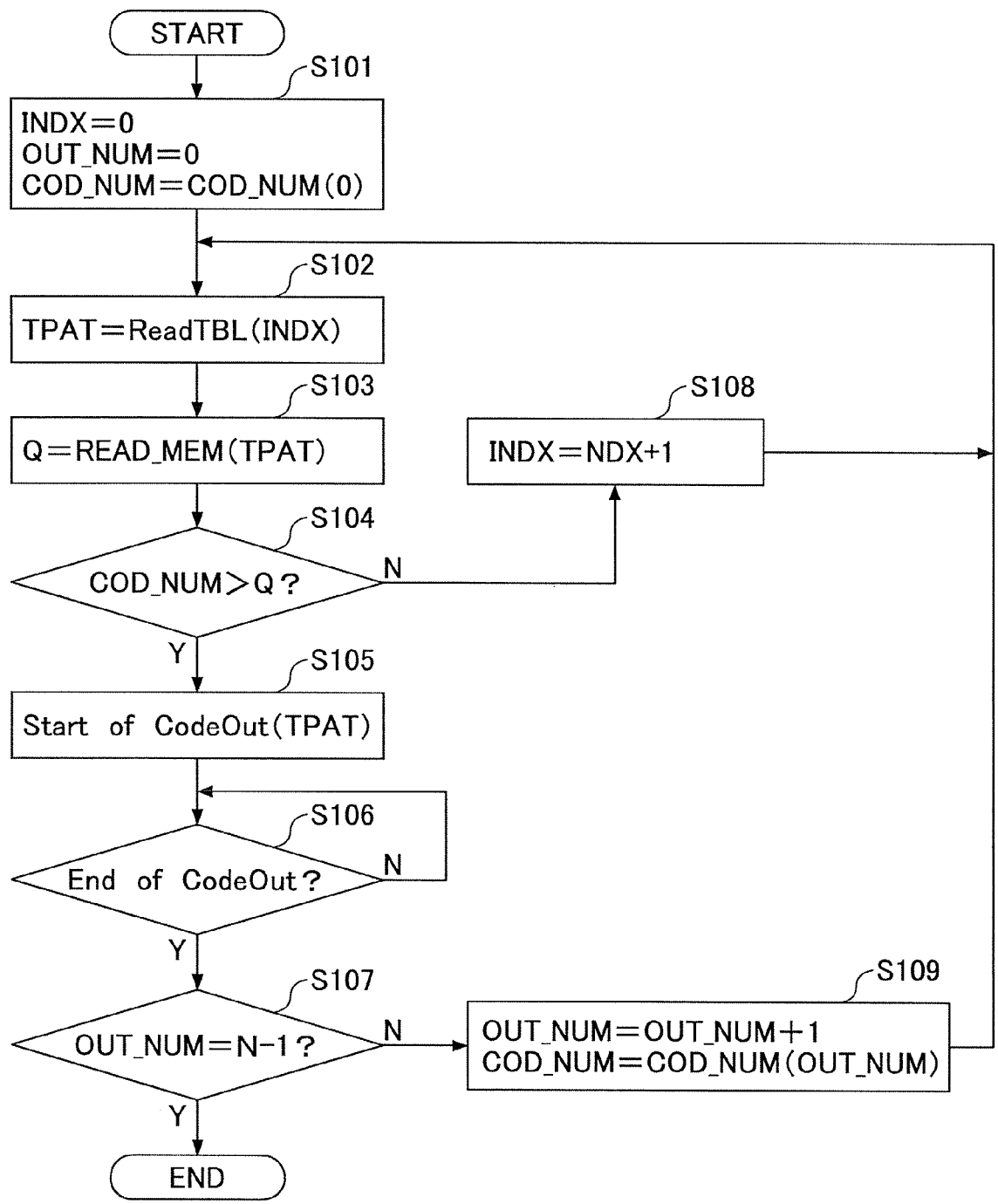
FIG. 14 is a flowchart for illustrating the image coding method according to an embodiment of the present invention.

FIG. 14 is a flowchart for illustrating the image coding method according to an embodiment of the present invention. FIG. 14 illustrates an example performed by the code amount control circuit 94 in the image coding circuit 9 in FIG. 13. Through the processing in FIG. 14, it is possible to generate N sets of code data from one image data set with a small number of steps.

In step S101 of FIG. 14, the code amount control circuit 94 initializes parameters. Here, a variable "INDEX" for referring to the table and the number of the code data set to be generated "OUT_NUM" are each initialized to "0," and "COD_NUM," a target code amount, is set to an initial target code amount "COD_NUM (OUT_NUM) (where OUT_NUM=0)." In addition, "N," the number of code data sets to be generated, is set.

Step S101 is followed by step S102 where the candidate specification unit 541 of the code amount control circuit 94 refers to the table stored in the table holding unit 97 and acquires the record corresponding to an initial "INDEX." The acquired record is assigned to a variable "TPAT." For example, the code amount control circuit 94 acquires the record of "INDEX=0" and assigns it to the variable "TPAT." Accordingly, identification information on a candidate for the MQ code to be truncated is stored in the variable "TPAT."

Step S102 is followed by step S103 where the calculation unit 543 of the code amount control circuit 94 acquires the amount of MQ codes excluding the one to be truncated from among those stored in the memory 98 based on the identification information on the candidate for the MQ code to be truncated stored in the variable "TPAT." Based on the amount, the calculation unit calculates the sum "Q."

Step S103 is followed by step S104 where the determination unit 545 of the code amount control circuit 94 compares the sum "Q" calculated in step S103 and the target code amount "COD_NUM" set in step S101. If the target code amount "COD_NUM" is greater than the sum "Q," the process proceeds to step S105. If not, the process proceeds to step S108.

In step S108 following step S104, "INDEX" as the parameter for referring to the table is incremented by 1, and the process returns to step S102. Accordingly, if the candidate for the MQ code to be truncated that is written in the record corresponding to "INDEX" does not satisfy the predetermined relationship with the target code amount "COD_NUM (OUT_NUM)," the determination unit 545 repeatedly compares another candidate for the MQ code to be truncated that is written in the record corresponding to the following INDEX with the target code amount "COD_NUM (OUT_NUM)."

In step S105 following step S104, on the other hand, the code generation circuit 95 starts generating code data excluding the MQ code to be truncated based on the identification information on the candidate for the MQ code to be truncated, which is written in the record read out in step S101.

Step S105 is followed by step S106 where the code generation circuit 95 completes generating the code data and determines whether the generation of the N-th code data set has been completed. If the N-th code data set has been completed, the process forwards to step S107. If not, the process of step S106 will be repeated.

In step S107 following step S106, the code amount control circuit 94 determines whether the generation of N sets of code data has been entirely completed. In other words, the code amount control circuit 94 determines whether the counter "OUT_NUM" indicating the number of code data sets that have been already processed is identical with "N−1." If they are identical with each other, the process is completed. If not, the process proceeds to step S109.

In step S109 following step S107, the counter "OUT_NUM" indicating the number of processed code data sets is incremented by 1, and the target code amount "COD_NUM" is set to the target code amount (OUT_NUM) corresponding to the incremented "OUT_NUM." After the parameter is updated in step S109, the process returns to step S102 to repeat the processing.

With the above processing, it is possible to output the code data sets corresponding to the plural different target code amounts. Furthermore, the "COD_NUM (n)" of the target code amounts is arranged in descending order of code amount, and the number of clusters of the entropy codes to be truncated is listed in the table in ascending order. Accordingly, when one code data set is to be generated, it is possible to start the processing of referring to the table to acquire the record from the INDEX at the time of generating the previous code data set. Therefore, it is not necessary to repeat the same processing when plural code data sets are to be generated. As a result, the processing can be accelerated.

Note that the embodiment of the present invention is not limited to this example. For example, "COD_NUM (n)" of the target code amount may be arranged in ascending order of code amount. Furthermore, the number of identification information items of the MQ codes included in the code data set may be written in the table of the table holding unit 97 in ascending order.

(Configuration of Computer)

Figure 15:
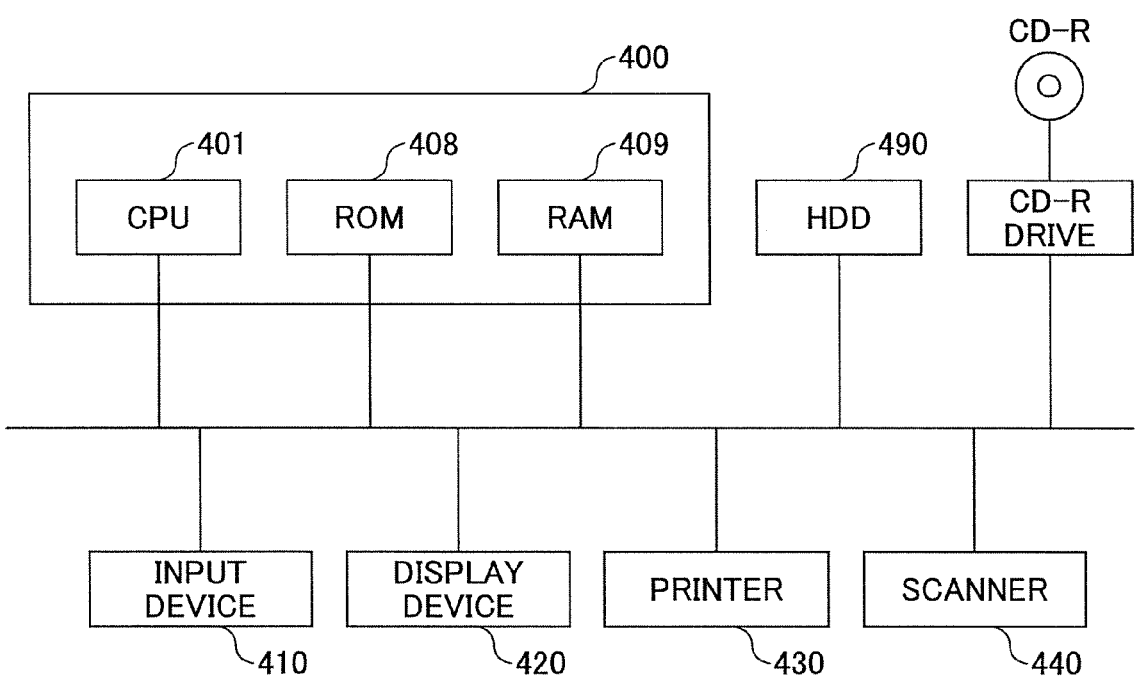
FIG. 15 is a block diagram of a computer that realizes the image processing apparatus according to an embodiment of the present invention.

FIG. 15 is a block diagram of a computer that realizes the image processing apparatus of the embodiments. The computer of FIG. 15 includes a main processing section 400 and an input device 410. The computer may further include a display device 420, a printer 430, a scanner 440, and a HDD 490. The main processing section 400 is the main part that performs the functions of the computer and includes a CPU 401, a ROM 408, and a RAM 409. The CPU 401 executes the computer program according to the embodiments of the present invention by reading out the computer program from the ROM 408 or the like and loading the same into the RAM 409. The ROM 408 is a nonvolatile memory and holds programs such as the computer program executed by the CPU 401, parameters required for controlling the image coding apparatus, and the like. The RAM 409 is a working memory used when the CPU 401 performs processing.

The input device 410 is a keyboard and the like used when an operator provides instructions. The display device 420 displays the status of the computer. The printer 430 is an apparatus that forms images on a medium to be output, and the scanner 440 is an apparatus that optically scans the images formed on the medium. The HDD 490 stores large volumes of data such as data of images. Note that data may be stored in a recording medium such as a CD-R.

The computer program of the embodiments of the present invention may be stored not only in the HDD 490 or the ROM 408 but also in a recording medium capable of being inserted in other drive units (not shown).

The present invention is not limited to the specifically disclosed embodiments, and variations and modifications may be made without departing from the scope of the present invention.

The present application is based on Japanese Priority Application No. 2007-067254, filed on Mar. 15, 2007, the entire contents of which are hereby incorporated herein by reference.

What is claimed is:

1. An image coding method by which plural code data sets each having a different code amount are generated from one image data set, the method comprising the steps of:
    setting a different target code amount for each of the code data sets;
    applying entropy coding processing to the image data set so as to generate plural entropy codes;
    specifying one of the entropy codes to be truncated so as to control a code amount for each different target code amount;
    truncating the one of the entropy codes specified in the code amount control step;
    generating the corresponding code data set;
    specifying a candidate for the entropy code to be truncated;
    calculating a code amount of other codes excluding the specified candidate for the entropy code to be truncated;
    determining whether the calculated code amount calculated in the calculation step and the target code amount satisfy a predetermined relationship; and
    specifying the candidate for the entropy code to be truncated as an entropy code to be truncated if the calculated code amount and the target code amount satisfy the determined relationship;
    wherein, if the calculated code amount and the target code amount do not satisfy the predetermined relationship, another candidate for the entropy code to be truncated is added in the order of making a lesser contribution to quality of a decoded image corresponding to the code data set so as to specify the candidate for the entropy code to be truncated, or
    an entropy code not to be truncated is added in the order of making a greater contribution to the decoded image corresponding to the code data set so as to correct the candidate for the entropy code to be truncated.

2. The image coding method according to claim 1, wherein the candidate for the entropy code to be truncated is specified based on a table in which information related to the contribution to the quality of the decoded image corresponding to the code data set is made to correspond to a cluster having the different entropy code.

3. The image coding method according to claim 1, wherein, where the entropy coding processing is applied to a bit plane constituting data input,
    the candidate for the entropy code to be truncated is specified by specifying the bit plane in the candidate specification step.

4. The image coding method according to claim 1, wherein the predetermined processing includes frequency decomposition.

5. The image coding method according to claim 4, wherein, where the frequency decomposition comprises wavelet transformation in which sub-band transformation is repeatedly performed,
    the entropy code to be truncated is specified according to a level of a sub-band.

6. The image coding method according to claim 1, wherein, where JPEG-2000 standard is used, the entropy code to be truncated is specified based on a table in which the number of passes of the entropy code to be truncated is specified for a different component and/or a different sub-band.

7. The image coding method according to claim 1, further comprising applying a predetermined processing to the image data set.

8. An image coding apparatus that generates plural code data sets each having a different code amount from one image data set, the apparatus comprising:
    a target code amount setting unit configured to set a different target code amount for each of the code data sets;
    an entropy code generation unit configured to apply entropy coding processing to the image data set so as to generate plural entropy codes;
    a code amount control unit configured to specify one of the entropy codes to be truncated so as to control a code amount for each different target code amount; and
    a code data generation unit configured to truncate the one of the entropy codes specified by the code amount control unit and to generate the corresponding code data set,
    wherein the code amount control unit includes:
    a candidate specification unit configured to specify a candidate for the entropy code to be truncated;
    a calculation unit configured to calculate a code amount of other codes excluding the entropy code specified by the candidate specification unit;
    a determination unit configured to determine whether the code amount calculated by the calculation unit and the target code amount satisfy a predetermined relationship; and
    a specification unit configured to specify the candidate for the entropy code to be truncated which is specified by the candidate specification unit as an entropy code to be truncated if the code amount and the target code amount satisfy the predetermined relationship;
    wherein, if the code amount and the target code amount do not satisfy the predetermined relationship, the candidate specification unit is configured to add another candidate for the entropy code to be truncated in the order of making a lesser contribution to quality of a decoded image corresponding to the code data set so as to specify the candidate for the entropy code to be truncated, or to correct the candidate for the entropy code to be truncated by adding an entropy code not to be truncated in the order of making a greater contribution to the decoded image corresponding to the code data set.

9. The image coding apparatus according to claim 8, wherein the predetermined processing includes frequency decomposition.

10. The image coding apparatus according to claim 9, wherein, where the frequency decomposition comprises wavelet transformation in which sub-band transformation is repeatedly performed, the code amount control unit is configured to specify the entropy code to be truncated according to a level of a sub-band.

11. The image coding apparatus according to claim 8, further comprising a processing unit configured to apply a predetermined processing to the image data set.

12. A computer program on a non-transitory computer-readable medium that causes a computer to perform the image coding method according to claim 1.

13. A non-transitory computer-readable information recording medium having recorded therein the computer program according to claim 12.

* * * * *